(12) United States Patent (10) Patent No.: US 8,269,842 B2
Wang et al. (45) Date of Patent: Sep. 18, 2012

| | | | |
|---|---|---|---|
| (54) | CAMERA GESTURES FOR USER INTERFACE CONTROL | WO | 2006 074290 7/2006 |
| | | WO | 2007 068791 6/2007 |
| | | WO | 2008/038096 4/2008 |
| (75) | Inventors: Kongqiao Wang, Beijing (CN); Liang Zhang, Beijing (CN); Yuanchun Shi, Beijing (CN) | | OTHER PUBLICATIONS |

International Search Report, PCT/IB2009/005913, maildate Sep. 15, 2009.

(73) Assignee: Nokia Corporation, Espoo (FI)

Jianbo Shi et al, "Good Features to Track," pp. 563-600, 1994, IEEE.

( * ) Notice: Subject to any disclaimer, the term of this patent is extended or adjusted under 35 U.S.C. 154(b) by 1087 days.

Liang Zhang et al., "NALP: Navigating Assistant for Large Display Presentation Using Laser Pointer," pp. 39-44, ACHI2008 (International Conference on Advances in Computer-Human Interaction). Feb. 10-15, 2008 Sainte Luce, Martinique.

Jianbo Shi et al, "Good Features to Track," Proc. IEEE Comput. Soc. Conf. Comput. Vision and Pattern Recog., pp. 593-600, 1994.

(21) Appl. No.: 12/137,202

Bouguet, J.V., "Pyramidal Implementation of the Lucas Kanade Feature Tracker Description of the Algorithm." Intel Corporation Microprocessor Research Labs. 1999.

(22) Filed: Jun. 11, 2008

Korean Patent Application No. 10-2011-7000451 Office Action dated Jun. 28, 2012, including translation.

(65) Prior Publication Data

US 2009/0309765 A1 Dec. 17, 2009

* cited by examiner

(51) Int. Cl.
*H04N 5/228* (2006.01)

*Primary Examiner* — Luong T Nguyen

(52) U.S. Cl. .................................. 348/208.12

(74) *Attorney, Agent, or Firm* — Banner & Witcoff Ltd.

(58) Field of Classification Search ............. 348/208.12, 348/208.14
See application file for complete search history.

(57) ABSTRACT

(56) References Cited

A system and method for using images captured from a digital camera to control navigation through a three-dimensional user interface. The sequence of images may be examined to identify feature points to be tracked through successive frames of the images captured by the camera. A plurality of classifiers may be used to discern shift from rotation gestures, based on expected behavior of feature points in the image when the camera is shifted or rotated in position. The various classifiers may generate voting values for shift and rotation gestures, and the system can use historical gesture information to assist in categorizing a current gesture.

U.S. PATENT DOCUMENTS

| | | | | |
|---|---|---|---|---|
| 6,944,315 | B1 * | 9/2005 | Zipperer et al. | .............. 382/103 |
| 7,620,316 | B2 * | 11/2009 | Boillot | .......................... 396/429 |
| 2002/0140666 | A1 | 10/2002 | Bradski | |
| 2006/0181510 | A1 | 8/2006 | Faith | |
| 2007/0222746 | A1 * | 9/2007 | LeVine | .......................... 345/156 |
| 2008/0170776 | A1 * | 7/2008 | Albertson et al. | ............ 382/154 |

FOREIGN PATENT DOCUMENTS

| | | |
|---|---|---|
| WO | 2006 018482 | 2/2006 |
| WO | 2006 036069 | 4/2006 |

36 Claims, 6 Drawing Sheets

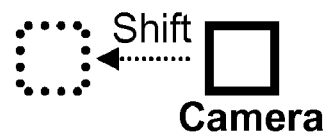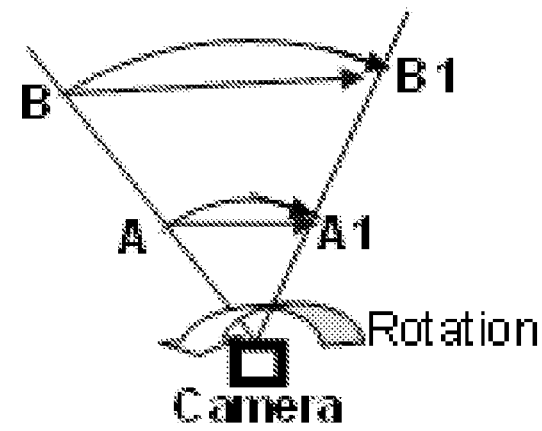
Fig. 8A
Fig. 8B
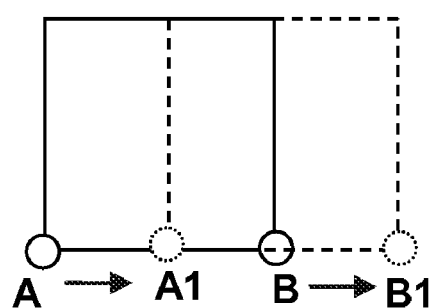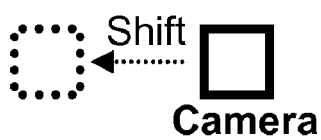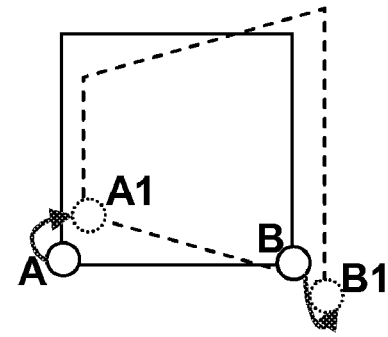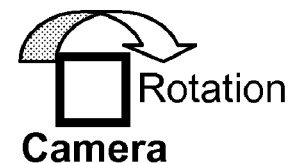
Fig. 9A
Fig. 9B

CAMERA GESTURES FOR USER INTERFACE CONTROL

BACKGROUND

Human beings rely heavily on visual cues. The graphical user interface for personal computers helped those machines gain widespread acceptance, and the HyperText Markup Language (HTML), with its graphical presentation of data, did the same for the Internet.

A key component to these kinds of visual interfaces is the mechanism for user input. Devices such as hand-held computer mice, trackballs, and touch pads are used to allow the intuitive movement of an onscreen cursor through the visual interface. But these are two-dimensional input devices, useful for providing input to the two-dimensional user interface on computer displays.

As computer processing power increases, more and more user interfaces are incorporating three-dimensional features. Unfortunately, the mice, trackballs and touch pads currently in use are not the most ideal for navigating through a three-dimensional environment. Accordingly, there is a need for an improved approach to navigating through three-dimensional interfaces.

SUMMARY

Certain features described herein provide a novel approach to navigating through a three-dimensional environment. In various embodiments, this approach uses a camera as the navigation device. In some embodiments, cameras currently in use (e.g., digital cameras that are incorporated into many cellular telephones) may be used as a three-dimensional navigation tool to, for example, move a cursor through a three-dimensional virtual space on a computer.

In some embodiments, a system may identify a plurality of feature points from a current video image from a camera; compare positions of the feature points with corresponding positions of the feature points from a prior video image from the camera; determine, from changes in said positions of said feature points, three-dimensional movement of the camera; and output an identification of the three-dimensional movement of the camera as a gesture output.

In some embodiments, the determining differentiates between shift and rotation gestures of the camera by applying a plurality of classifiers to differences in positions of the feature points between the current and prior images.

The classifiers may include a first classifier based on whether a plurality of feature points share a common movement distance, a second classifier based on whether different ones of the feature points moved by different distances, a third classifier based on an average moving speed of the feature points, and a fourth classifier based on how frequently new feature points have been needed.

In some embodiments, a predetermined range of feature points can be required for operation. In certain situations, some embodiments may record a history file of recorded gestures, and some gestures may be recorded as a shift in the history but output as a rotation (or vice versa) to the interface application.

In some embodiments, a cellular telephone camera can be used to navigate through a three-dimensional user interface on a personal computer.

Other features and aspects are described in the discussion below.

BRIEF DESCRIPTION

A more complete understanding of the features described herein and the advantages thereof may be acquired by referring to the following description in consideration of the accompanying drawings, in which like reference numbers indicate like features, and wherein.

Figure 7B:
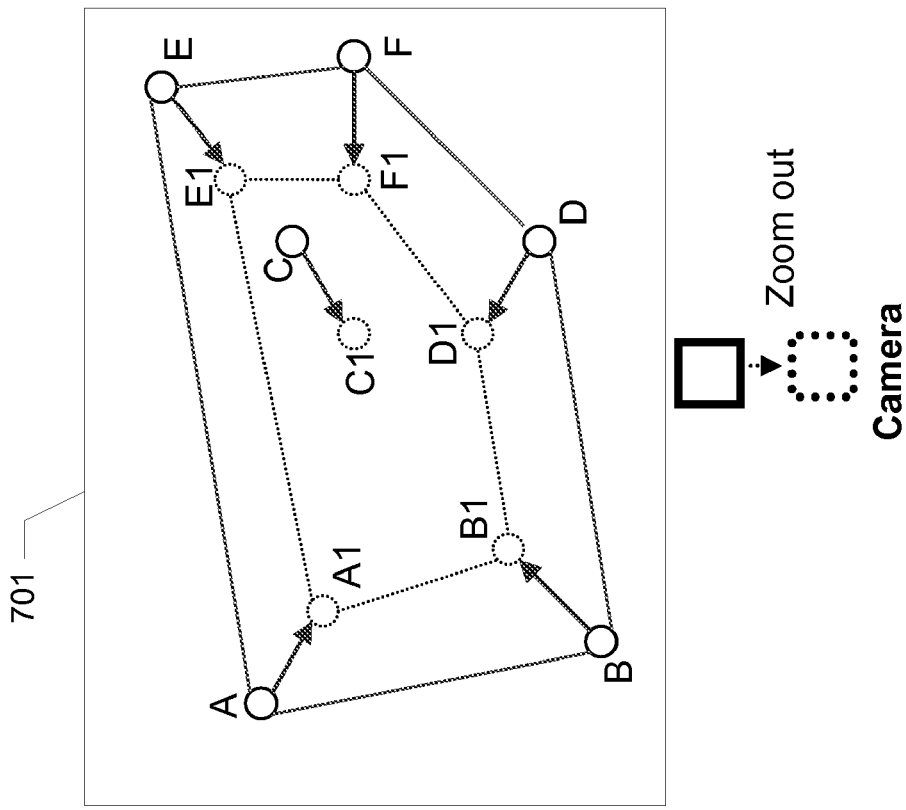
Figure 7A:
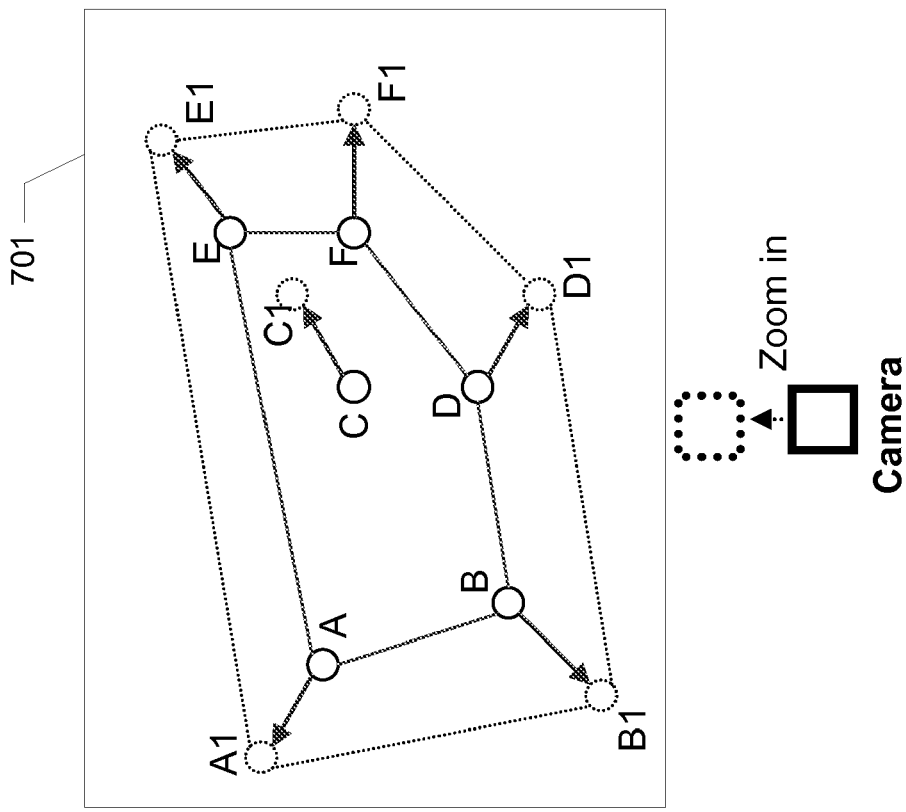

FIGS. 7A-B illustrate a comparison of movement distances for classifying a gesture as a zoom.

FIGS. 8A-B illustrate a comparison of movement distances for a classifier usable to distinguish shift movements from rotation movements.

FIGS. 9A-B illustrate a comparison of movement distances for a second classifier usable to distinguish shift movements from rotation movements.

DETAILED DESCRIPTION

In the following description, reference is made to the accompanying drawings, which form a part hereof, and in which is shown by way of illustration various features that may be used. It is to be understood that other embodiments may be utilized and structural and functional modifications may be made without departing from the scope and spirit of the present application.

Figure 1:
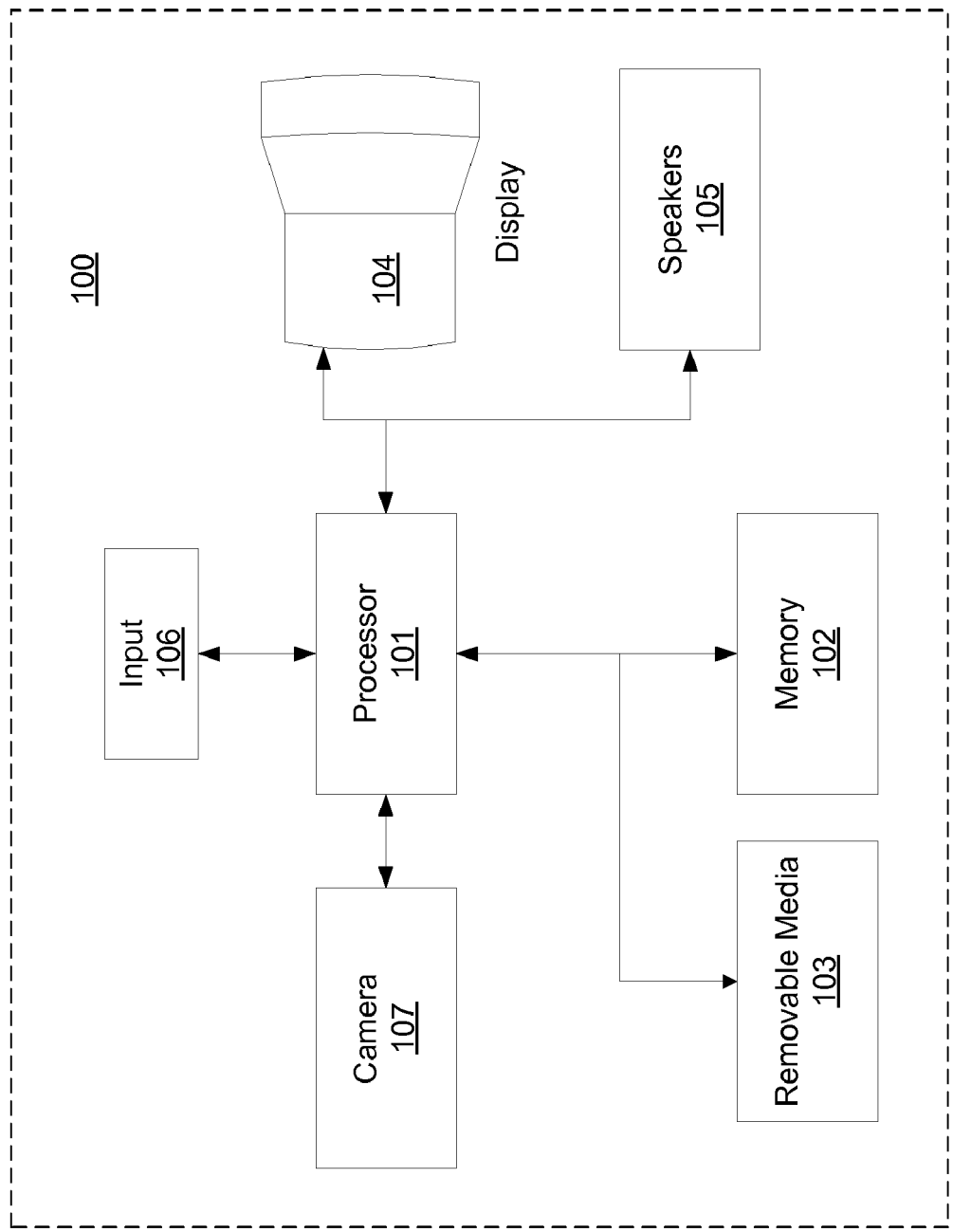
FIG. 1 illustrates basic components of a computing system on which features described herein may be implemented.

FIG. 1 illustrates, in one aspect described herein, basic components of a computing system on which features described herein may be implemented. The system 100 may take the form of a general purpose computer, such as a personal computer. Alternatively, system 100 may be implemented as any other fixed or mobile electronic device, such as a mobile cellular telephone, mobile communication device, personal data assistant (PDA), pager, TV device, music player, AM/FM/digital radio receiver, video player, camera, etc.

The system 100 may have one or more processors 101, such as a programmable logic device or multi-purpose microprocessor, that may execute instructions to provide features described herein. The instructions may be stored as computer-readable instructions on one or more computer-readable or electronic storage media, such as memory devices 102, which may be dynamic and/or static random access memories (RAM), read-only memories (ROM), magnetic or optical disk, or any other desired computer-readable storage device. The system 100 may also include one or more removable media 103 that can also store any of the data described herein (e.g., computer-readable instructions, data described below, etc.). The removable media 103 may be any desired type, such as removable FLASH memory, disk drives, optical or magnetic disks, etc.

The system 100 may include one or more output devices to provide information and feedback to the user. The output devices may include video output devices, such as a display 104, which can display menu choices, interactive displays, video, or any other visible information to the user. The output devices may also include one or more speakers 105, which can be used to play audio tracks or songs for the user.

The system 100 may also include one or more user input devices 106. The user input devices 106 may be, for example, alphanumeric push buttons on a keyboard (e.g., desktop computer keyboard, mobile telephone keypad, etc.), touch and/or capacitive-sensitive pads on a laptop, computer mouse, trackball, stylus on a sensitive input area or display, etc.

The system 100 is illustrated as an integral system, but may be separated into various distinct components as desired. For example, camera 107 may be a separate handheld camera, such as that on a cellular telephone, communicatively coupled to the rest of the system through a wired and/or wireless interface. For example, camera 107 may be part of a cellular telephone communicating (e.g., via Bluetooth™ connection) with a local desktop computer. The processor 101 may be a processor of such a computer system, or it may be located within the same device as the camera 107. As another embodiment, the camera 107 may be a hand-held input device, such as a computer mouse, coupled by wire connection to the rest of the system 100.

Figure 2:
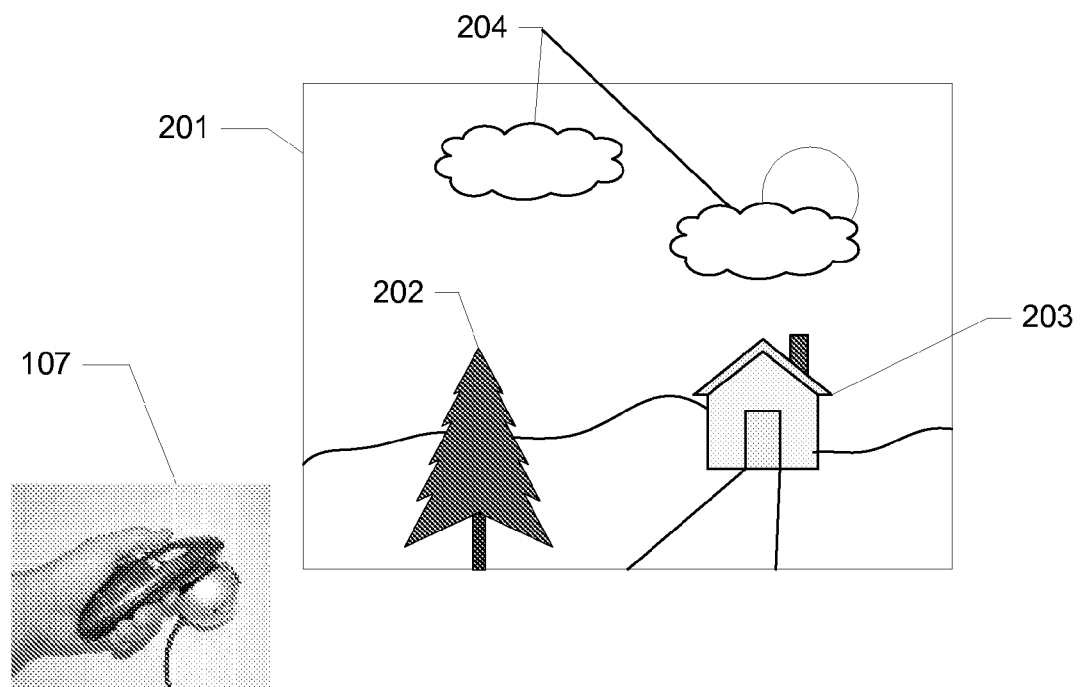
FIG. 2 illustrates an example embodiment of a hand-held camera viewing an example scene.

As illustrated in FIG. 2, the camera 107 may view a scene 201, and may return data corresponding to the scene to the processor 101. The data may be in any desired video image format, such as *jpg, *.pdf, *.bmp, etc. The scene 201 itself may have various components, illustrated in the example as a tree 202, house 203 and clouds 204, and identification of features in the viewed components will be used as discussed below.

Figure 3:
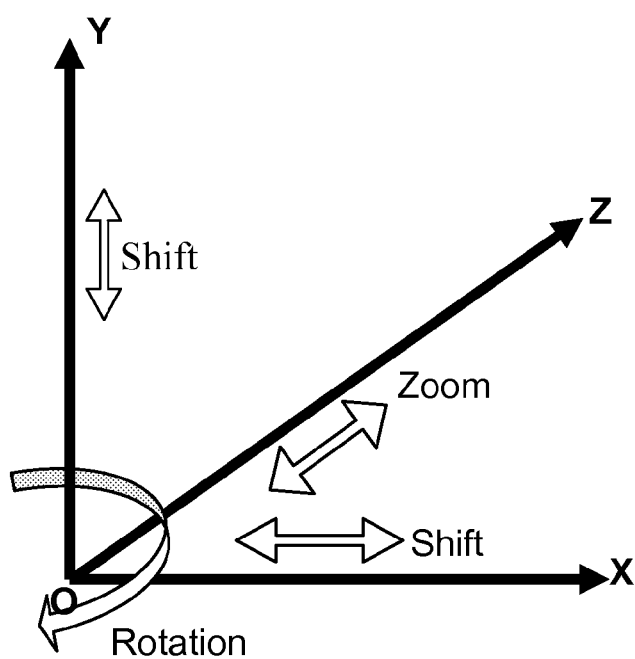
FIG. 3 illustrates example types of movement of the camera in FIG. 2.

Over time, the camera 107 may be moved in various ways. FIG. 3 illustrates three primary ways of movement. As illustrated, the camera is shown with a sight line that is in line with the Z-axis. One way of movement is a zoom movement, which entails movement along the Z-axis towards, or away from, the scene being viewed. A second way of movement would be a shift movement, which entails movement in the X-Y plane (a 100% shift movement would have no Z-component, or no zoom component). A third way of movement is a rotation movement. As illustrated, the rotation may be a twisting around the Y-axis. Rotation may also be around the X-axis or Z-axis, although the description herein will focus on rotations around the X- or Y-axes. Rotations about the Z-axis may also be considered as a type of shift. As described below, the systems described herein may discern movement of the camera based on changes in the images seen, and use that movement to interact with an interface, such as a three-dimensional user interface. For example, a three-dimensional user interface may include three-dimensional graphical simulations of objects, and navigating through this space may involve not only moving up/down/left/right, as in traditional computer interfaces, but moving into and out of the interface as well.

Figure 4:
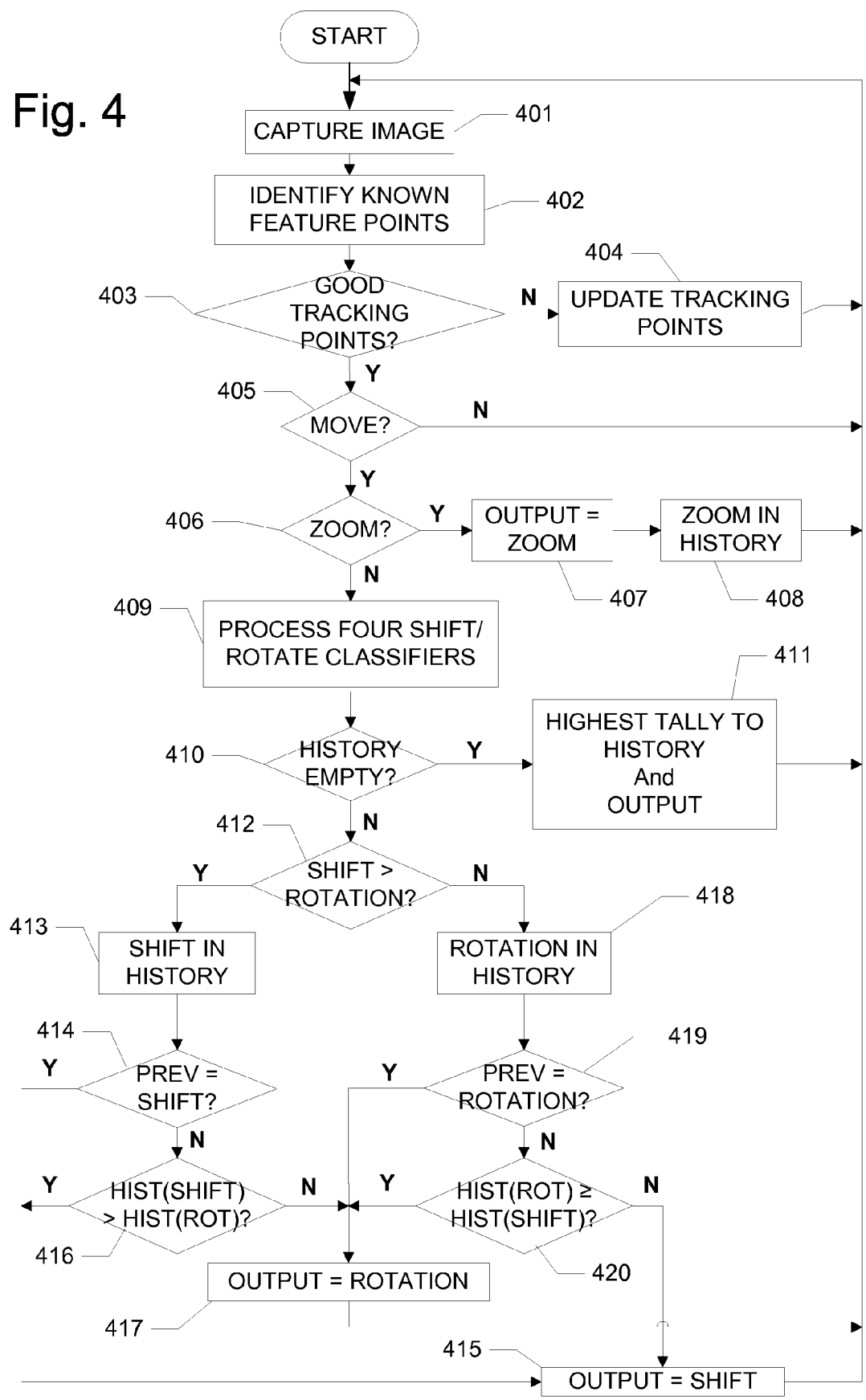
FIG. 4 illustrates an example method of using the camera as a three-dimensional navigation tool.

FIG. 4 illustrates an example method, by which a camera 107 may be used as a gesture input device to provide zoom, shift and rotation inputs to a three-dimensional user interface application running on the processor 101. First, in step 401, a video image is captured from the camera 107. The video image may be sampled at any desired rate, such as 30 frames per second. The rate may be the same as the rate at which images are actually provided by the camera 107, or alternatively, the system may sample 401 just a fraction of the images provided by the camera 107 (e.g., every $5^{th}$ frame, etc.).

Figure 5:
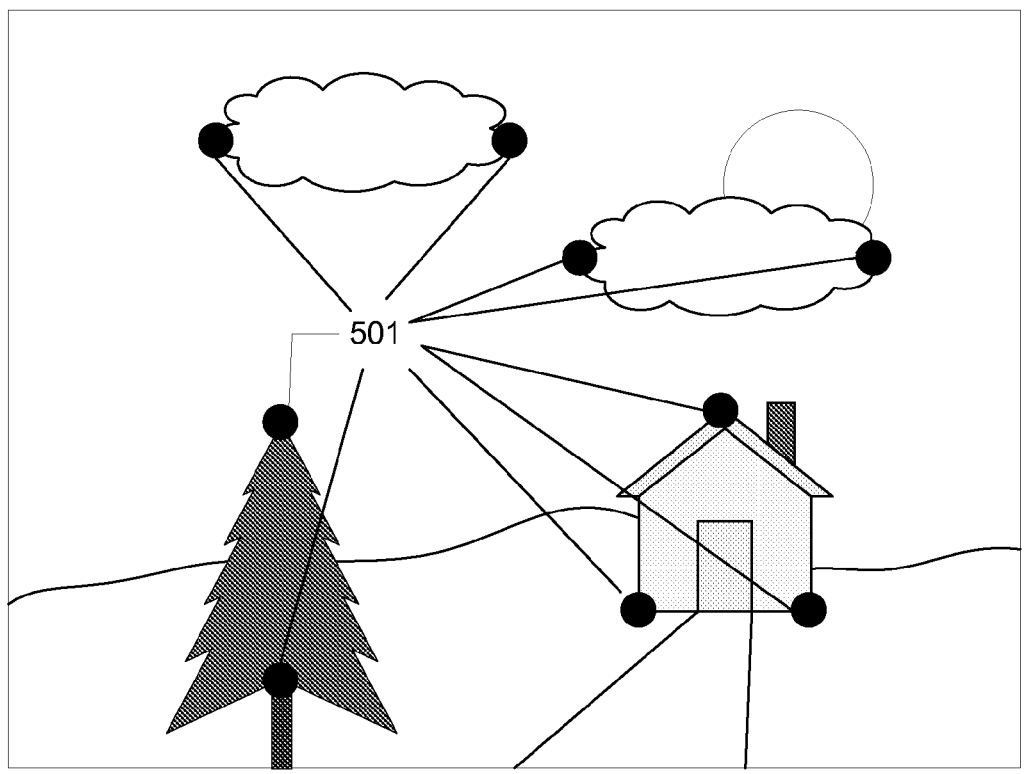
FIG. 5 illustrates the example scene from FIG. 2, but with example feature points identified.

In step 402, the image is processed to identify known feature points. Feature points are points in the image that can be tracked across multiple images. Any desired pattern recognition process may be used to identify the feature points. FIG. 5 illustrates the example scene 201 from FIG. 2, and several example feature points 501. The points may be identified due to contrasts in color, depth, shape, or whatever feature or pattern is recognizable by the desired pattern recognition method. Example pattern recognition processes are described in Jianbo Shi et al., "Good Features to Track", Proc. IEEE Comput. Soc. Conf. Comput. Vision and Pattern Recogn., pp. 593-600, 1994 or Bouguet, J. V., "Pyramidal Implementation of the Lucas Kanade Feature Tracker Description of the Algorithm," Intel Corp. Microprocessor Research Labs, 1999.

Figure 6:
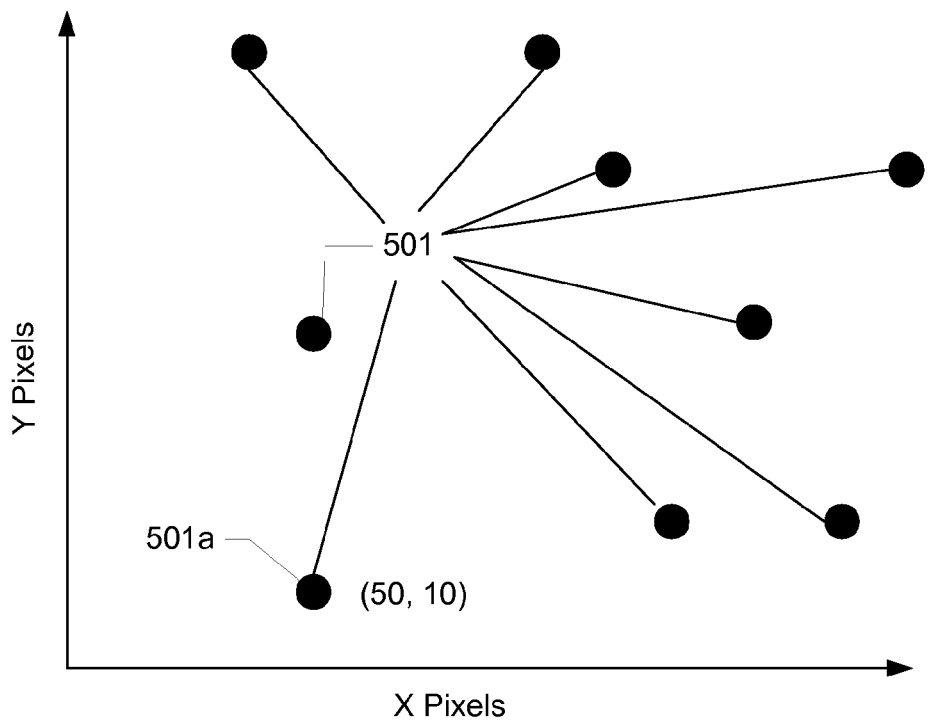
FIG. 6 illustrates the example feature points from FIG. 5, but in isolation with pixel coordinates.

FIG. 6 illustrates an example of the set of feature points 501 from FIG. 5, but considered in isolation. When identifying these feature points, the system may assign two-dimensional X-Y coordinate values to the locations of the points within the field of view. For example, if the camera image support 320× 240 pixels, then the system could use a 320×240 pixel coordinate system to describe the location of the feature points within the field of view. In the FIG. 6 example, point 501a might be at location (50 pixels, 10 pixels) on the field of view.

The system may be configured to require a predetermined number of known feature points tracked from a prior image. For example, the system may require a minimum of 5, and a maximum of 30, feature points in a current image that were also found in an earlier image. The movement of those known points, or tracking points, is used to interpret the movement of the camera 107. The first time through step 402, when no prior tracking points exist, the system may use the pattern recognition process to identify the highest desired number of feature points (e.g., 30), and may store data in memory reflecting the identified feature points. On subsequent passes through step 402, as the camera 107 is moved and feature points pass into and out of the field of view, the system may specifically look just for the tracking points. In these subsequent passes 402, the system may compare data identifying the recently-detected feature points with the previously-stored feature point identifications, to identify the known feature points for tracking.

In step 403, the system may determine whether a sufficient number of tracking points have been detected in the current image. This sufficiency may be any desired range. For example, the system may place a minimum number of tracking points (e.g., 5) and a maximum number of tracking points (e.g., 30) to be used. If the number of identified tracking points falls outside of this range (e.g., less than 5 tracking points detected), the system may proceed to step 404 to obtain new feature points and update the tracking points used. In step 404, the pattern recognition process may be performed to identify additional feature points from the current image to replace the set of tracking points stored in memory, or to simply identify additional tracking points to supplement the existing ones and bring the total number back up to a desired level (e.g., the original max of 30). With the new set of tracking points in place, the system can return to step 401 to capture the next image.

If, in step 403, sufficient tracking points were detected in the current image, the process may move to step 405 to determine whether a movement has been detected at all. This may be performed by checking to see if one (or more) of the tracking points have moved more than a predetermined distance. For example, the system may check to find the average distance moved for the various tracking points, and if that average distance is no more than 2 pixels, the system can assume that no actual movement or gesture has yet occurred. This predetermined distance may be any desired distance to allow for a user's unsteady hands. If no movement is detected, the process may return to step 401 to capture the next image.

If, in step 405, it is determined that a movement gesture has occurred, the process may proceed to step 406, and determine whether a zoom gesture has been made with the camera 107. As illustrated in FIG. 3, a zoom gesture involves moving the camera along the Z-axis, towards or away from the scene. With such a gesture, the feature points will move towards, or away from, the outer periphery of the image. FIGS. 7A-B illustrate this movement. In FIG. 7A, six tracking points are shown at positions A-F in an earlier image, and in the current image, they are at positions A1-F1. The new positions A1-F1 are closer to the outer periphery 701 of the image, a result of the camera being moved towards (closer to) the scene. Those points are also farther away from a central point in the scene. FIG. 7B shows a different zoom—one in which the camera moves away from the scene, and the various feature points move away from the outer periphery 701 of the image (or towards a central point).

In step 406, the system may use the change in position of the tracking points in the field of view to determine whether a zoom gesture has been performed. This can be performed in a variety of ways. For one example, the system may define a polygon by connecting a selected subset of the feature points (e.g., points A, B, D, E and F in the FIGS. 7A-B examples), and determine whether the total area of the polygon has increased or decreased in the field of view. If it increased, then the camera 107 zoomed towards the scene, while the opposite is true if the total area decreased. As another example, the system can check to see if the feature points are closer to, or farther from, the outer periphery 701 of the field of view in the image. If the tracked feature points include points that are closer to each edge of the periphery 701 (e.g., at least one point is closer to the left edge, at least one is closer to the upper edge, at least one is closer to the right edge, and at least one is closer to the bottom edge), then the camera 107 has zoomed closer to the scene. Alternatively, if the tracked feature points are farther from the outer periphery, or closer to a central point, then the camera 107 has zoomed farther away from the scene.

If, in step 406, it is determined that the camera 107 performed a zoom gesture, then a zoom indication is output in step 407. This output may simply be a signal from the processor 101 that the camera 107 has zoomed. The zoom output signal may be provided to a software process (e.g., another process executing on processor 101), which can then use the zoom gesture in its own processing. For example, a three-dimensional user interface application may be stored in memory 102 or removable media 103, and may execute on processor 101 to use the zoom gesture to perform a corresponding zoom in the three-dimensional user interface. In this way, movement of the camera may cause a corresponding movement of a cursor in a three-dimensional user interface application to navigate through three-dimensional elements.

In step 408, the fact that a zoom gesture was made can be added to a history file (e.g., in memory 102) that records the various gestures that have been detected by the system. The history file can record data corresponding to gestures made with the camera 107, and can record data for a predetermined period of time in the past. For example, the history may store data for the last 5 frames processed. Other time periods can be used, such as anywhere in 5-10 frames. The data can simply indicate that a zoom took place, or it can include more specific information such as the time of the gesture, amount of zoom detected, the distances between the tracking points and a central point and/or outer periphery, the number and identity of tracking points used to classify the zoom, the polygon defined (if any) and feature points used to define it, the calculated area of the polygon, etc. The history file may record every gesture made within the period of time, and may also store information for captured images for which no movement was detected (e.g., in step 405, if no movement is detected, the history can record a "still gesture" to indicate the lack of a movement gesture). After updating the history file, the system may return to step 401 to capture the next image.

If, in step 406, the system determined that no zoom gesture has been made, the system may proceed to step 409 and process classifiers to determine whether a shift or rotation gesture was made. Various classifiers may be used to make this differentiation. Each classifier may be a process or program that analyzes a predetermined aspect of the viewed image to cast a vote for whether the camera has received a shift or rotation gesture. Different classifiers, and the aspects that they consider, are discussed below. The total may be a voting process. For example, one classifier might indicate that the gesture appeared to be a shift, while another classifier might indicate that the gesture appeared to be a rotation. The system may total the votes for each in a running tally in memory, and provide an end result (e.g., concluding that the gesture was a shift) as an output.

In some embodiments, each classifier routine may cast a single vote for either a shift or a rotation. In other embodiments, the various classifier routines may cast weighted votes based on their confidence levels. So, for example, if one classifier routine feels strongly that the gesture was a shift, but another classifier only disagreed weakly, the resulting tally can still reflect that the gesture was most likely a shift. Examples of weighting possibilities are discussed below with the classifiers.

A first, All-Points-Moved, classifier may be based on determining whether all of the feature points, or at least a predetermined number of them, experienced a common amount of movement distance from their position in the previous image. As illustrated in FIG. 8A, if all points in the field of view moved the same amount, then the gesture is more likely to have been a shift. By contrast, as illustrated in FIG. 8B, if the gesture was a rotation, then the feature points that were located farther from the camera (e.g., the feature point B in FIG. 8B) would move a greater distance within the field of view than the points that were closer (e.g., the feature point A in FIG. 8B), so one would expect different feature points to move different distances depending on their proximity to the camera 107.

To implement this classifier, the system may first determine the distances that the tracked feature points moved in the field of view (e.g., 200 pixels), and the direction of movement (at an angle of 30 degrees). The system may then consider whether the detected movement of a predetermined number of the tracked feature points is the same (suggesting a shift gesture was made), or if there are sufficient differences such that a rotation gesture is likely. For example, the system can determine whether all of the tracked features have movement that is the same. In such a situation, the classifier may cast a vote for a shift. If fewer than the predetermined number of points had common movement (e.g., less than 90% of the tracked points), or if the movements of the tracked points differed by more than a threshold amount (e.g. 10% difference in distance and/or angle), the classifier may decide against voting for a shift, and may vote for a rotation.

The All-Points-Moved classifier may also be weighted. For example, if only 90% of the points moved the same distance, the classifier may cast a slightly weaker vote (e.g., 0.8 of a vote) for the shift. Also, if the distances and/or angles of movement varied slightly (e.g., by 5%), the classifier may cast a weaker vote for the shift. Similarly, if the distances differed by more than another predetermined amount, or if many points had different movements, the classifier could cast a strong vote for a rotation, but if some of the distancesmon movement (e.g., 10% of the points), the classifier may were common (e.g., 10%), or if some of the points had comcast a weaker vote for a rotation.

The second classifier, or Relative Location Change classifier, examines the relative positioning between neighboring feature points. This classifier is based on the same premise as the first classifier—namely, the expected difference in movement amount for far and near features, as illustrated in FIGS. 8A and 8B. However, instead of examining the movement of the feature points individually, the second classifier considers the changes in distance between pairs of feature points. FIGS.

This Relative Location Change classifier process may be performed for just two points, but as an alternative, it may be performed for every possible pair of tracked feature points. Each possible pair may register its own vote (shift or rotation) depending on whether that particular pair happened to retain its relative positioning, and the overall vote from this second classifier may be based on the individual votes for each pair. For example, if there are ten tracked features points (P1-P10), then this relative position calculation can be performed for every possible pair of points, resulting in a table such as the following:

| | | | | Individual Votes Per Pair of Tracked Feature Points | | | | | |
|---|---|---|---|---|---|---|---|---|---|
| | P1 | P2 | P3 | P4 | P5 | P6 | P7 | P8 | P9 | P10 |
| P1 | | | | | | | | | | |
| P2 | Shift | | | | | | | | | |
| P3 | Shift | Shift | | | | | | | | |
| P4 | Shift | Shift | Shift | | | | | | | |
| P5 | Rotation | Shift | Shift | Shift | | | | | | |
| P6 | Shift | Rotation | Rotation | Shift | Shift | | | | | |
| P7 | Shift | Shift | Shift | Shift | Rotation | Shift | | | | |
| P8 | Shift | Shift | Rotation | Shift | Shift | Shift | Shift | | | |
| P9 | Shift | Rotation | Rotation | Shift | Rotation | Shift | Shift | Shift | | |
| P10 | Shift | Shift | Shift | Shift | Shift | Rotation | Shift | Shift | Shift | |

9A and 9B illustrate this concept. As shown in FIG. 9A, if the camera shifts position, then features points at positions A and B in an earlier image would be expected to maintain their relative position with respect to one another when they are at locations A1 and B1. The physical object having those feature points (e.g., a square in FIG. 9A) remains of the same proportions. In other words, the distance between A and B should be the same as the distance between A1 and B1. Alternatively, if the camera is rotated, one would expect the object to appear different, and the positioning between the feature points to have changed. So as illustrated in FIG. 9B, the distance between A and B is not the same as the distance between A1 and B1, and their angular relationship is also different (a flat horizontal line between A and B, but an angled line between A1 and B1).

This classifier may be implemented in a number of ways. For example, the differences between the feature points' coordinates may be calculated on a per-axis basis. So, for example, if points A, B, A1 and B1 have coordinates $(X_A, Y_A)$, $(X_B, Y_B)$, $(X_{A1}, Y_{A1})$, and $(X_{B1}, Y_{B1})$, respectively, the classifier routine may calculate the differences between the positions in the X- and Y-dimensions. So in the original image, the distance in the X-coordinate would be $\Delta X = X_B - X_A$; while the distance in the Y-coordinate would be $\Delta Y = Y_B - Y_A$. In the new image, the differences would be $\Delta X1 = X_{B1} - X_{A1}$ and $\Delta Y1 = Y_{B1} - Y_{A1}$. If the differences are the same, or close to one another, then the points have maintained their relative positioning, and the classifier would vote for a shift instead of a rotation. So, for example, if the change in the distance in the X-axis is less than a predetermined value $\epsilon$ (where $\epsilon$ is a small value, like 10 pixels) $|\Delta X - \Delta X1| < \epsilon$, and the same is true in the Y-axis, then the relative distances are considered to be the same.

Conversely, if the difference in the X- or Y-axis distances between two feature points exceeds a predetermined amount $\zeta$ (e.g., 100 pixels), then the classifier may register a vote for a rotation gesture, since rotations alter the relative positions as illustrated in FIG. 9B.

In the above example, 36 of the possible pairs maintained their relative positioning (thereby supporting a conclusion that a shift gesture occurred), while 9 of the possible pairs changed their relative positioning (thereby supporting a conclusion that a rotation gesture occurred). With this example, 80% (36/45) of the pairings suggested a shift occurred, while 20% (9/45) suggested a rotation. The final vote for this second classifier may simply be a full vote for the higher result (shift, in this case), or the vote may be weighted to reflect the split (e.g., a 0.8 vote for shift).

The third classifier, the Update Speed classifier, may be based on how frequently the system needs to generate the update in step 404. As discussed above, the update is needed when an insufficient number of tracked feature points can be found in the current image, and new/additional feature points are needed. Since a rotation is generally more likely to require new feature points (during a rotation, the feature points will move faster through the field of view than during a shift), if the system is performing the update very often, then this suggests that the camera 107 is in the midst of a rotation. In one embodiment, this frequency may be measured in terms of the captured images. For example, if more than 1 update was performed for the last five processed frames, this classifier may generate a vote for a rotation gesture in the current frame.

As an alternative to basing the determination on a predetermined number of processed images, the system may simply record the time whenever an update is performed, and this third classifier may generate a rotation vote for a predetermined amount of time (e.g., 500 ms) after each update.

A fourth classifier, or Average Moving Speed classifier, may also be used. This fourth classifier may involve computing the average moving speed for all tracked feature points, and bearing in mind the fact that feature points tend to move faster through the field of view during a rotation than during a shift. If the average speed exceeds a first predetermined value (e.g., 18 pixels per frame, at 30 fps, in a 320×240 pixel frame), then the classifier determines that a rotation has occurred. If the average speed falls below a second predetermined value (e.g., 13 pixels per frame, at 30 fps, in a 320×240 pixel frame), this fourth classifier may conclude that a shift has occurred. If the average speed falls between these values (e.g., between 13 and 18 pixels in the example environment), then the classifier simply withholds a vote.

When all of the various classifiers have processed the image, the memory will contain a total of the votes cast for shift and rotation by the various classifiers. The process will then use this total to generate an output interpreting the current gesture, and to update a history of recorded gestures.

In step 410, this history is checked to determine whether it is empty. If the history is empty (e.g., no gestures have been recorded for the duration of the history), then the process may move to step 411 and update the history file with an entry identifying the gesture (shift or rotation) that had the highest vote count from the applied classifiers. The gesture recorded in the history may also be output as the gesture detected, for use by the three-dimensional interface application. The output (and history file entry) may, in addition to simply identifying whether a shift or rotation was detected, also include information identifying the distance (e.g., in pixels) of the shift, the direction (e.g., in angle) of the shift, the angular direction of rotation (e.g., clockwise), or the angular amount of the rotation (e.g., in degrees with respect to the axis of rotation). If the output is a shift, the system may determine the distance and direction of the shift based on the measurements and calculations generated in the Relative Location Change classifier discussed above. If the output is a rotation, the direction of rotation can also be determined from the data generated in the Relative Location Change classifier (e.g., if the points moved to the right, then the camera rotated to the left).

If, in step 410, the history was not empty, then the process may move to step 412, and determine whether there were more votes received for a shift, or for a rotation. If there were more votes cast for a shift, then the process moves to step 413 and adds a notation of the shift gesture in the history.

Then, in step 414, the system may determine whether the previously output gesture was also a shift. As noted above, the history file may store indications of gestures detected by the system. As will be explained below, there may be instances in which one gesture is output, but a different one is recorded in history. Accordingly, the history file may also store (or a separate file may store) an indication of the last gesture that was actually output, in addition to the previous entry recorded in the history. If it was, then the process may move to step 415, in which a shift is output as the detected gesture. The process would then return to step 401 to process the next image.

If, however, the previously output gesture in step 414 was not a shift, the process may move to step 416 to determine which gesture, shift or rotation, appears more often in the history. If more shifts have been registered, then the process moves to step 415 and a shift is output. However, if more rotations have been registered, or if an equal number of rotations and shifts have been registered, then the process moves to step 417, in which a rotation is output. This interesting turn of events, the recording of a shift in history but the outputting of a rotation gesture, may be useful to prevent rapid toggling between shift and rotation interpretations for borderline situations. With the output, the process may return to step 401 to process the next image.

Back in step 412, if there were more votes for rotation in the current tally, then the process may move to step 418 and record a rotation in the history. If, in step 419, the previously output gesture was also a rotation, then the process moves to step 417 and a rotation gesture is output. If, in step 419, the previously output gesture was not a rotation, then the process moves to step 420 to determine which gesture, shift or rotation, appears more frequently in the history. If more rotations appear, or if an equal number of rotations and shifts appear, the process moves to step 417 and a rotation is output. If more shifts appear, the process moves to step 415 and outputs a shift. Again, this circumstance, recording a rotation in the history but outputting a shift, helps to prevent rapid toggling between the two for borderline situations.

The features described above allow a natural and intuitive interface for a three-dimensional user interface using a digital camera as the input or navigation device. In some embodiments, an ordinary handheld computer mouse can be outfitted with a camera, and additional software on an attached personal computer may allow the user to use the device as an ordinary mouse for typical two-dimensional interface applications, and to pick up the mouse and use the camera as an input device when a three-dimensional interface application is used. Alternatively, the processor 101 may be a general purpose personal computer processor, and the camera may be part of a cellular telephone. In such a configuration, a user may use his or her cell phone to connect (e.g., via a wireless connection) to a personal computer, and use the cell phone camera to navigate through a three-dimensional user interface. For example, the cell phone can use a BLUETOOTH™ wireless connection to connect to a personal computer.

The various embodiments and features described above are illustrative examples, and variations may be made as desired. For example, the physical configuration shown in FIG. 1 is just one arrangement. The various components may be arranged differently, subdivided or combined, or otherwise modified and yet remain within the scope of the present description.

Additionally, the process shown in FIG. 4 is an illustrative example, but variations may be made as desired. Steps may be interchanged, omitted, or added to achieve a desired result within the scope of the present description.

The illustrative features described above are examples. The scope of the present patent should not be limited to require all described features, but should rather only be limited by the claims that follow.

We claim:

1. A method, comprising:
   identifying a plurality of feature points from a current video image from a camera;
   comparing positions of feature points from the current video image with corresponding positions of feature points from a prior video image from said camera;
   determining, from changes in said positions of said feature points, three-dimensional movement of the camera;
   outputting an identification of the three-dimensional movement of the camera as a gesture output;
   counting the number of identified feature points in the current video image that were also found in the prior video image;
   comparing the number of identified feature points with a predetermined minimum number of feature points; and
   updating the feature points by identifying one or more new feature points in the current video image if the number of identified feature points falls below the predetermined minimum number of feature points.

2. The method of claim 1, wherein said determining differentiates between shift and rotation gestures of said camera by applying a plurality of classifiers to differences in positions of said feature points between said current and prior images.

3. The method of claim 2, wherein said plurality of classifiers includes a first classifier based on whether a plurality of feature points shares a common movement distance.

4. The method of claim 2, wherein said plurality of classifiers includes a second classifier based on whether different ones of said feature points moved by different distances.

5. The method of claim 2, wherein said plurality of classifiers includes a third classifier based on an average moving speed of said feature points.

6. The method of claim 1, wherein said determining differentiates between shift and rotation gestures of said camera based on how often said updating is performed.

7. The method of claim 1, further comprising:
determining that a movement of the camera was a shift or rotation movement; and
recording a corresponding shift or rotation movement in a movement history of the camera, but outputting a gesture different from the movement recorded in the movement history.

8. The method of claim 7, wherein
if the movement was determined to be a shift movement, identifying the movement as a rotation movement in said outputting; and
if the movement was determined to be a rotation movement, identifying the movement as a shift movement in said outputting.

9. The method of claim 2, wherein said plurality of classifiers includes:
a first classifier based on whether a plurality of the feature points have a common movement distance;
a second classifier based on a difference in movement distance for two of said feature points;
a third classifier based on how often new feature points are required; and
a fourth classifier based on an average movement speed of said feature points.

10. The method of claim 1, further comprising:
using a cellular telephone camera to navigate through a three-dimensional user interface on a computer.

11. The method of claim 1, wherein said determining determines that the three-dimensional movement is a zoom movement.

12. An apparatus, comprising:
a video input configured to receive video image data from a camera; and
a processor, configured to:
identify a plurality of feature points from a current video image from said camera;
compare positions of feature points from the current video image with corresponding positions of feature points from a prior video image from said camera;
determine, from changes in said positions of said feature points, three-dimensional movement of the camera;
output an identification of the three-dimensional movement of the camera as a gesture output;
count the number of identified feature points in the current video image that were also found in the prior video image;
compare the number of identified feature points with a predetermined minimum number of feature points; and
update the feature points by identifying one or more new feature points in the current video image if the number of identified feature points falls below the predetermined minimum number of feature points.

13. The apparatus of claim 12, wherein determination differentiates between shift and rotation gestures of said camera by applying a plurality of classifiers to differences in positions of said feature points between said current and prior images.

14. The apparatus of claim 13, wherein said plurality of classifiers includes a first classifier based on whether a plurality of feature points shares a common movement distance.

15. The apparatus of claim 13, wherein said plurality of classifiers includes a second classifier based on whether different ones of said feature points moved by different distances.

16. The apparatus of claim 13, wherein said plurality of classifiers includes a third classifier based on an average moving speed of said feature points.

17. The apparatus of claim 12, wherein determination differentiates between shift and rotation gestures of said camera based on how often the number of identified feature points falls below the predetermined minimum number of feature points.

18. The apparatus of claim 12, said processor being further configured to:
determine that a movement of the camera was a shift or rotation movement; and
record a corresponding shift or rotation movement in a movement history of the camera, but output a gesture different from the movement recorded in the movement history.

19. The apparatus of claim 18, wherein the processor is further configured to:
if the movement was determined to be a shift movement, identify the movement as a rotation movement in said output; and
if the movement was determined to be a rotation movement, identify the movement as a shift movement in said output.

20. The apparatus of claim 13, wherein said plurality of classifiers includes:
a first classifier based on whether a plurality of the feature points have a common movement distance;
a second classifier based on a difference in movement distance for two of said feature points;
a third classifier based on how often new feature points are required; and
a fourth classifier based on an average movement speed of said feature points.

21. The apparatus of claim 12, wherein said apparatus is a computer communicatively coupled to said camera, and said camera is part of a computer mouse input device.

22. The apparatus of claim 12, wherein determination determines that the three-dimensional movement is a zoom movement.

23. A non-transitory computer-readable medium storing computer-executable instructions that, when executed by an apparatus:
identify a plurality of feature points from a current video image from a camera;
compare positions of feature points from the current video image with corresponding positions of feature points from a prior video image from said camera;
determine, from changes in said positions of said feature points, three-dimensional movement of the camera;
output an identification of the three-dimensional movement of the camera as a gesture output;
count the number of identified feature points in the current video image that were also found in the prior video image;
compare the number of identified feature points with a predetermined minimum number of feature points; and
update the feature points by identifying one or more new feature points in the current video image if the number of identified feature points falls below the predetermined minimum number of feature points.

24. The non-transitory computer-readable medium of claim 23, wherein determination differentiates between shift and rotation gestures of said camera by applying a plurality of classifiers to differences in positions of said feature points between said current and prior images.

25. The non-transitory computer-readable medium of claim 24, wherein said plurality of classifiers includes a first classifier based on whether a plurality of feature points shares a common movement distance.

26. The non-transitory computer-readable medium of claim 24, wherein said plurality of classifiers includes a second classifier based on changes in relative positioning between pairs of said feature points.

27. The non-transitory computer-readable medium of claim 24, wherein said plurality of classifiers includes a third classifier based on an average moving speed of said feature points.

28. The non-transitory computer-readable medium of claim 23, wherein determination differentiates between shift and rotation gestures of said camera based on how often the number of identified feature points falls below the predetermined minimum number of feature points.

29. The non-transitory computer-readable medium of claim 23, wherein the computer-executable instructions, when executed by the apparatus, also:
  determine that a movement of the camera was a shift movement; and
  record a corresponding shift movement in a movement history of the camera; but identify the movement as a rotation movement in said output.

30. The non-transitory computer-readable medium of claim 24, wherein said plurality of classifiers includes:
  a first classifier based on whether a plurality of the feature points have a common movement distance;
  a second classifier based on a difference in relative positioning between pairs of said feature points;
  a third classifier based on how often new feature points are required; and
  a fourth classifier based on an average movement speed of said feature points.

31. The non-transitory computer-readable medium of claim 23, wherein the computer-executable instructions, when executed by the apparatus, also:
  determine that the movement of the camera was a zoom movement.

32. The non-transitory computer-readable medium of claim 23, wherein the computer-executable instructions, when executed by the apparatus, also:
  determine that a movement of the camera was a shift or rotation movement; and
  record a corresponding shift or rotation movement in a movement history of the camera, but output a gesture different from the movement recorded in the movement history.

33. The non-transitory computer-readable medium of claim 32, wherein the computer-executable instructions further cause the following to occur when executed:
  if the movement was determined to be a shift movement, identify the movement as a rotation movement in said output; and
  if the movement was determined to be a rotation movement, identify the movement as a shift movement in said output.

34. The method of claim 1, wherein said determining differentiates between shift and rotation gestures of the camera by:
  evaluating the changes in said positions of said feature points using a plurality of classifiers that each cast a vote to classify the changes in said positions of said feature points as one of a shift gesture or a rotation gesture.

35. The method of claim 34, wherein movement of the camera is determined to be one of said shift gesture and said rotation gesture based on which gesture receives the most votes from the plurality of classifiers.

36. The method of claim 34, wherein the movement of the camera is determined to be one of said shift and said rotation gesture based on a weighted average of the votes of the plurality of classifiers, wherein the weight given to each vote is based on each classifier's confidence in its vote.

* * * * *